Patented Mar. 26, 1935

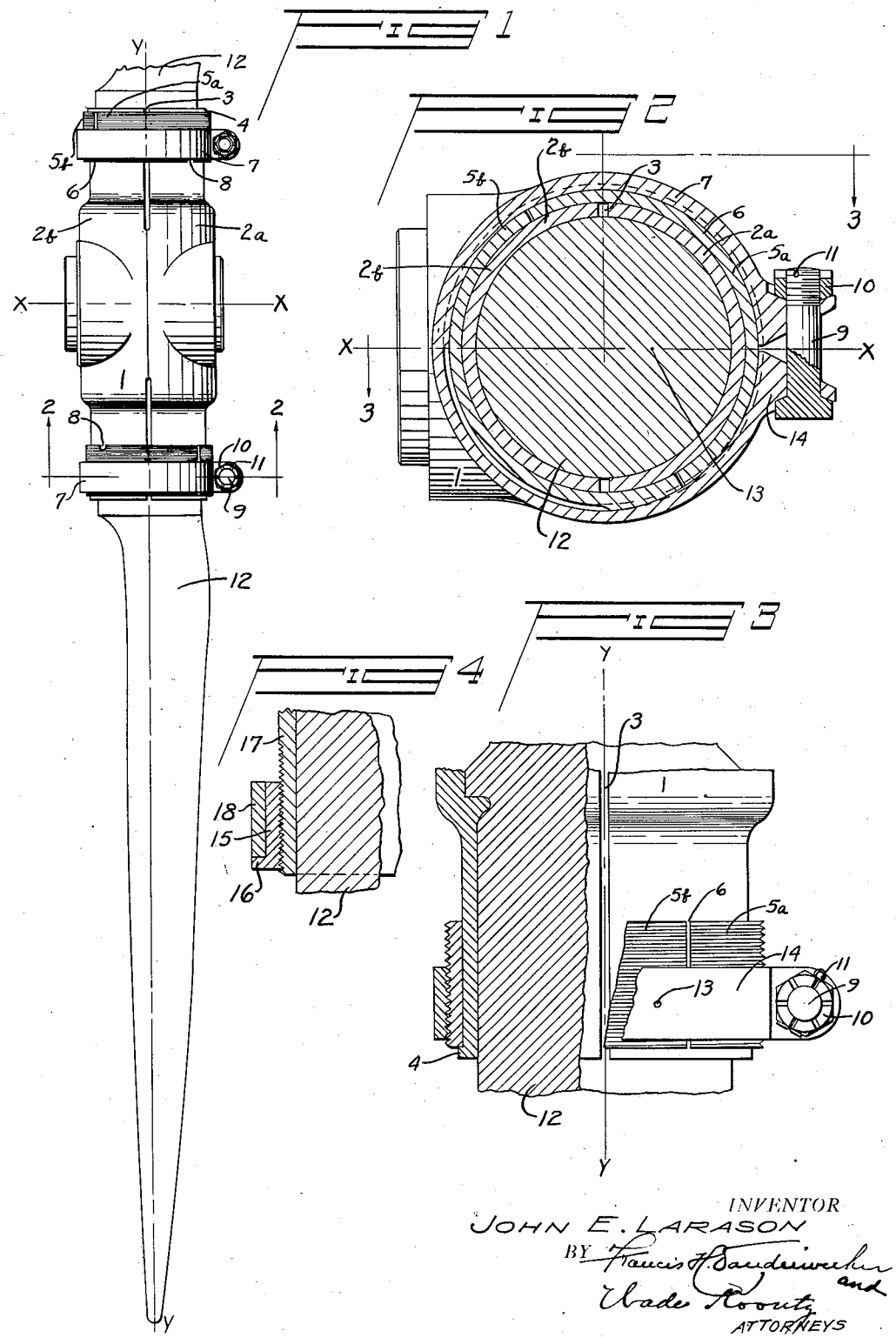

1,995,312

REISSUED

UNITED STATES PATENT OFFICE 1,995,312

PROPELLER CLAMPING AND BALANCING RING

John E. Larason, Dayton, Ohio

Application March 20, 1934, Serial No. 716,509

7 Claims. (Cl. 170—160)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to propellers for aircraft having adjustable, detachable or interchangeable blades.

It is well known to those skilled in the art that machining methods employed in the manufacture of the above referred to propeller blades necessitate two balancing operations before placement of an assembled propeller upon an aircraft engine. Having accomplished the first of these operations; i. e., vertical balance of the propeller, in the usual manner, it is a principal object of my invention to proceed with horizontal balance of said propeller without adversely affecting the aforementioned vertical balance.

With the foregoing and other objects in view, which will appear as the description proceeds, the invention consists of certain new and novel improvements in propeller clamp and balancing rings, which will be hereinafter more fully illustrated and described in the accompanying drawing and more particularly pointed out in the appended claims.

Referring to the drawing, in which numerals of like character designate similar parts throughout the several claims:

Figure 1 is a partial side view of a propeller incorporating my invention.

Figure 2 is a cross-sectional view taken on the line 2—2 of Figure 1.

Figure 3 is a partial cross-sectional view taken on the line 3—3 of Figure 2.

Figure 4 shows in partial cross-section a modified embodiment of my invention.

In Figure 1 a propeller hub 1, consisting of halves 2a and 2b, is provided with machined end portions having slots 3 and shoulders 4. Split rings 5a and 5b are adapted to be journalled to the aforementioned machined surfaces of the halves 2a and 2b such that gaps 6 exist between the split portions thereof. The outer surfaces of the split rings 5a and 5b are threaded to receive the threaded inner surfaces of clamping rings 7. The split rings 5a and 5b are provided with wrench slots 8. The open ends of the clamping rings 7 are provided with bolts 9, nuts 10, and cotter pins 11 by means of which the propeller hub 1, propeller blades 12, split rings 5a and 5b, and clamping rings 7 are held in fixed relationship.

Figure 2 is an enlarged cross-sectional view showing the propeller blade 12 clamped fast to the halves 2a and 2b of the propeller hub 1. It will be noted that the center of gravity 13 of clamp assembly 14 is eccentrically located with reference to the longitudinal axis $y$—$y$ of the propeller blade 12. The bolt 9 has been momentarily positioned normal to the axis $x$—$x$, in advance of the leading face of the assembled propeller.

Figure 3 is an additional enlarged view, showing in side elevation a portion of the structure shown in Figure 2. Assuming that the split rings 5a and 5b are held in constant contact with the shoulder 4 and that the clamp assembly 14 is held against rotation with respect to the propeller hub 1, rotation of the split rings 5a and 5b will effect longitudinal shifting of the center of gravity 13 in a path parallel to the longitudinal axis $y$—$y$ and, depending upon the direction of split ring rotation, either towards or away from the axis $x$—$x$ of the propeller assembly.

Figure 4 shows in partial cross-section a modification of the propeller hub 1, split rings 5a and 5b, and clamping ring 7 of Figure 3. Split rings 15a and 15b, provided with shoulders 16, are threaded to the end portion of a propeller hub 17. A clamping ring 18 is journalled to the outer surface of the split rings 15a and 15b, the former in all other respects constituting a duplication of the clamp ring 7.

The operation of my invention is as follows. The propeller assembly is positioned vertically upon a conventional balancing stand, the nuts 10 loosened, and the bolt portions of the clamping rings 7 or 18 rotated either clockwise or counterclockwise of the clamp position shown in Figure 2 until there is no tendency of the axis $y$—$y$ to deviate from true vertical. The propeller assembly is then positioned horizontally upon the balancing stand and lateral adjustment of clamping rings 7 or 18 individually effected in the manner previously discussed above.

It is of primary importance that the split rings 5a and 5b or 15a and 15b at all times maintain positive contact with the shoulders 4 or 16 of the propeller hubs 1 or 17 and that care be taken not to disturb the "vertical balance" settings of the aforementioned clamping rings with reference to the aforementioned propeller hubs. Each nut 10 is just sufficiently loosened to permit rotation of the aforesaid split rings within the aforesaid clamping ring without any turning of the latter with respect to the aforesaid propeller hubs.

It is obvious to those skilled in the art that very fine longitudinal adjustments may be obtained by means of my invention, which at the same time provides positive means against any lateral clamping ring slippage under the most severe of flying conditions.

It should be understood that my invention is equally applicable to propellers employing adjustable blades secured in unsplit propeller hubs, through incorporation of the shoulders 4 or 16 upon the outer extremities of the solid hub barrels or placement of similar shoulders upon the blade shanks immediately adjacent to said barrel extremities.

What I claim is:

1. In a propeller having detachable blades, means for effecting vertical and horizontal balance of said propeller comprising a pair of ring members oppositely disposed about the axis of propeller rotation and adjacent thereto, each of said members comprising two rotatable elements, one of said elements having its center of gravity eccentrically disposed with respect to the longitudinal axis of said propeller blades about which said element is adapted to be rotated, the other of said elements being concentrically disposed with respect to said longitudinal axis about and along which said element is adapted to be rotated and adjusted, and means for locking the elements of each of said pairs of members against movement relative to said propeller.

2. In a propeller having detachable blades, means for effecting vertical and horizontal balance of said propeller comprising a pair of ring members oppositely disposed about the axis of propeller rotation and adjacent thereto, each of said members comprising two rotatable elements, one of said elements having its center of gravity eccentrically disposed with respect to the longitudinal axis of said propeller blades about which said element is adapted to be rotated, the other of said elements being concentrically disposed with respect to said longitudinal axis about and along which said element is adapted to be rotated and adjusted, said means including means for locking the elements of each of said pairs of members against movement relative to said propeller.

3. In a propeller having detachable blades, means for effecting vertical and horizontal balance of said propeller comprising a pair of ring members oppositely disposed about the axis of propeller rotation and adjacent thereto, having inner and outer rotatable elements, each of said outer elements having its center of gravity eccentrically disposed with respect to the longitudinal axis of said propeller blades about which said element is adapted to be rotated, and each of said inner elements securing its associated outer element to said propeller such that said outer element is laterally adjusted, without rotation, about the longitudinal axis of said propeller blades by rotation of inner element about the aforesaid longitudinal axis, said means including means for locking the inner and outer elements of each of said pair of members against movement relative to said propeller.

4. In a propeller having detachable blades, means for effecting vertical and horizontal balance of said propeller comprising a pair of ring members oppositely disposed about the axis of propeller rotation and adjacent thereto, having inner and outer rotatable elements, each of said outer elements having its center of gravity eccentrically disposed with respect to the longitudinal axis of said propeller blades about which said element is adapted to be rotated, each of said outer elements being threaded upon its associated inner element and having its center of gravity eccentrically disposed with respect to the longitudinal axis of said propeller blades about which said element is adapted to be rotated, and said inner element being journalled to an outer extremity of the hub portion of said propeller such that outboard movement of said element is prevented by an outwardly turned flange terminating each end of said hub portion, said means including means for locking the inner and outer element of each of said pair of members against rotation relative to said propeller.

5. In a propeller having detachable blades, means for effecting vertical and horizontal balance of said propeller comprising a pair of ring members oppositely disposed about the axis of propeller rotation and adjacent thereto, having inner and outer rotatable elements, each of said outer elements having its center of gravity eccentrically disposed with respect to the longitudinal axis of said propeller blades about which said element is adapted to be rotated, each of said inner elements being threaded to an outer extremity of the hub portion of said propeller and having one end provided with an outwardly turned flange, and each of said outer elements being journalled to the outer surface of its associated said inner element such that outboard movement of said element is prevented by said outwardly turned flange, the center of gravity of the aforesaid outer element being eccentrically disposed with respect to the longitudinal axis of said propeller blades, said means including means for locking the inner and outer element of each of said pair of members against rotation relative to said propeller.

6. In a propeller having detachable blades, means for effecting vertical and horizontal balance of said propeller comprising a pair of ring members oppositely disposed about the axis of propeller rotation and adjacent thereto, having inner and outer rotatable elements, each of said outer elements comprising a clamping ring threaded upon its associated inner element and including a bolt and nut for locking the same, and each of said inner elements comprising a ring split longitudinally into a plurality of segments journalled to an outer extremity of the hub portion of said propeller such that outboard movement of said segments is prevented by an outwardly turned flange terminating each end of said hub portion.

7. In a propeller having detachable blades, means for effecting vertical and horizontal balance of said propeller comprising a pair of ring members oppositely disposed about the axis of propeller rotation and adjacent thereto, having inner and outer rotatable elements, each of said inner elements comprising a ring split longitudinally into a plurality of segments threaded to an outer extremity of the hub of said propeller and having one end provided with an outwardly turned flange, and each of said outer elements comprising a clamping ring, including a bolt and nut for locking the same, journalled upon the segments of said inner element such that outboard movement of said clamping ring is prevented by said outwardly turned flange.

JOHN E. LARASON.